July 31, 1951  H. E. ELLIS ET AL  2,562,539
APPARATUS FOR HANDLING AND LOADING CITRUS FRUIT
Filed Feb. 11, 1948  4 Sheets-Sheet 1
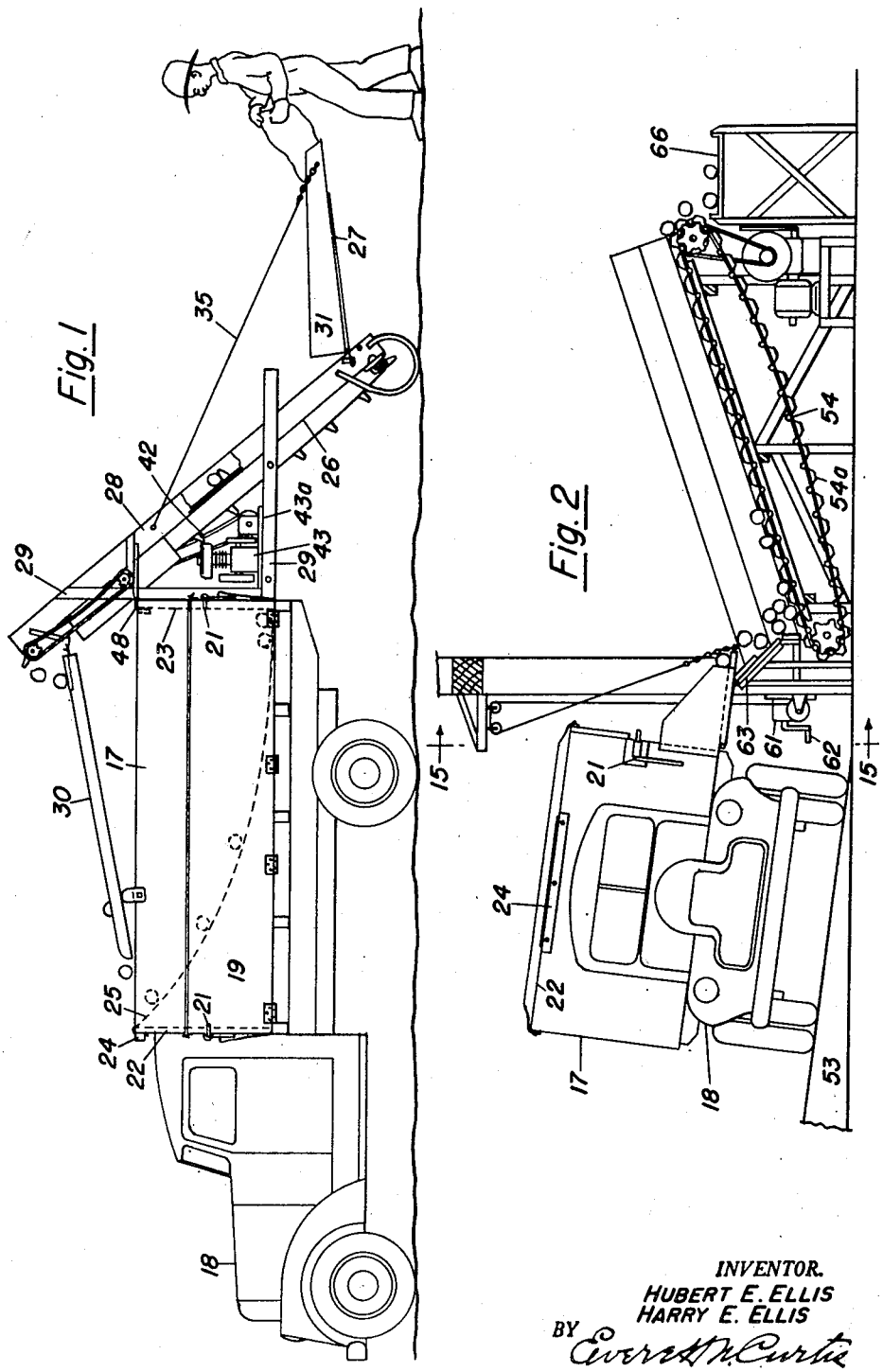
INVENTOR.
HUBERT E. ELLIS
HARRY E. ELLIS
BY
*Everett N. Curtis*
ATTORNEY July 31, 1951  H. E. ELLIS ET AL  2,562,539
APPARATUS FOR HANDLING AND LOADING CITRUS FRUIT
Filed Feb. 11, 1948  4 Sheets-Sheet 2
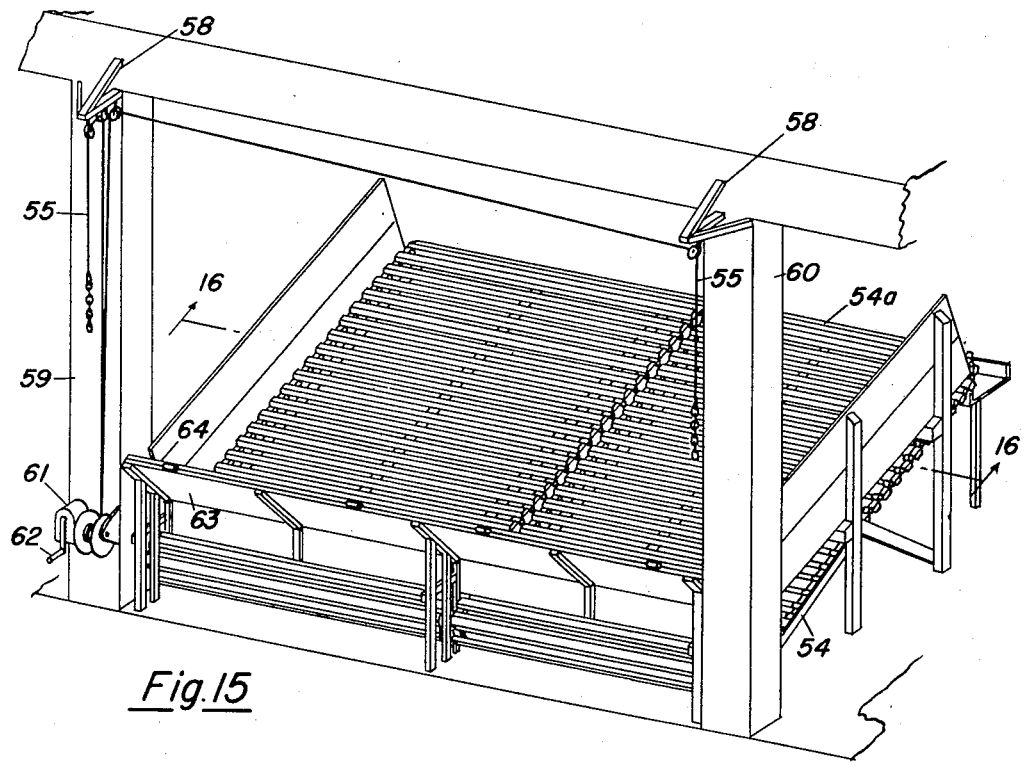
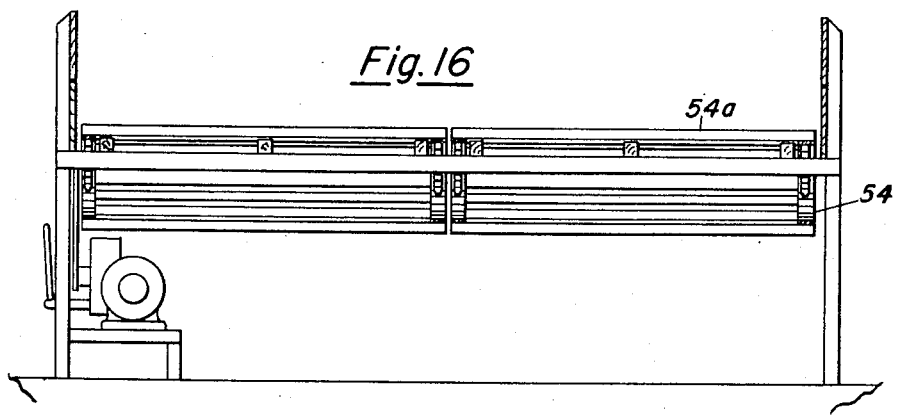
INVENTOR.
HUBERT E. ELLIS
HARRY E. ELLIS
BY
ATTORNEY July 31, 1951     H. E. ELLIS ET AL     2,562,539
APPARATUS FOR HANDLING AND LOADING CITRUS FRUIT
Filed Feb. 11, 1948     4 Sheets-Sheet 3
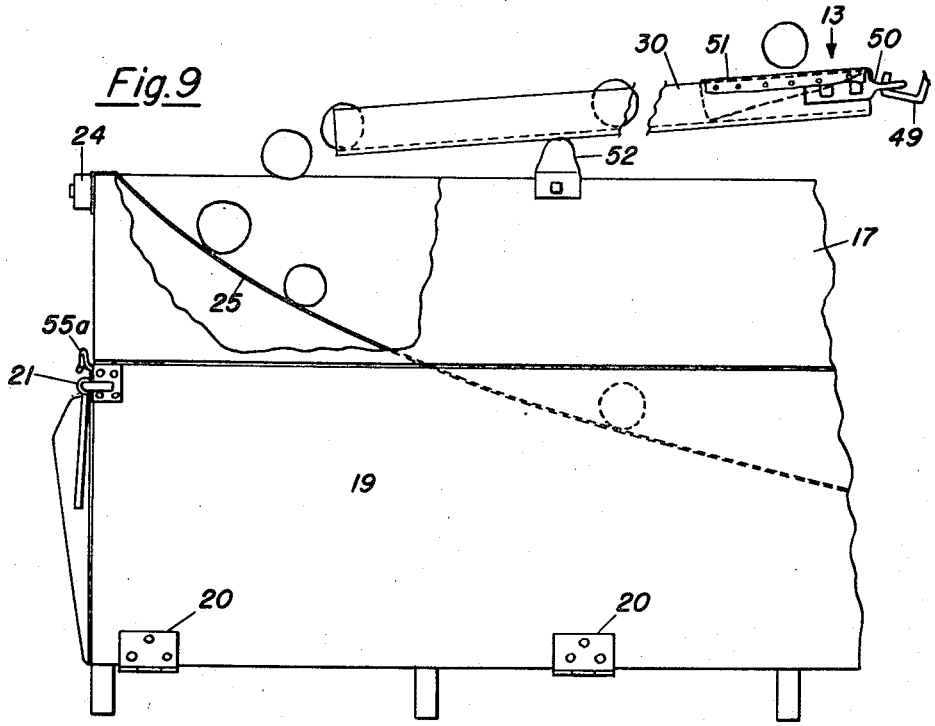
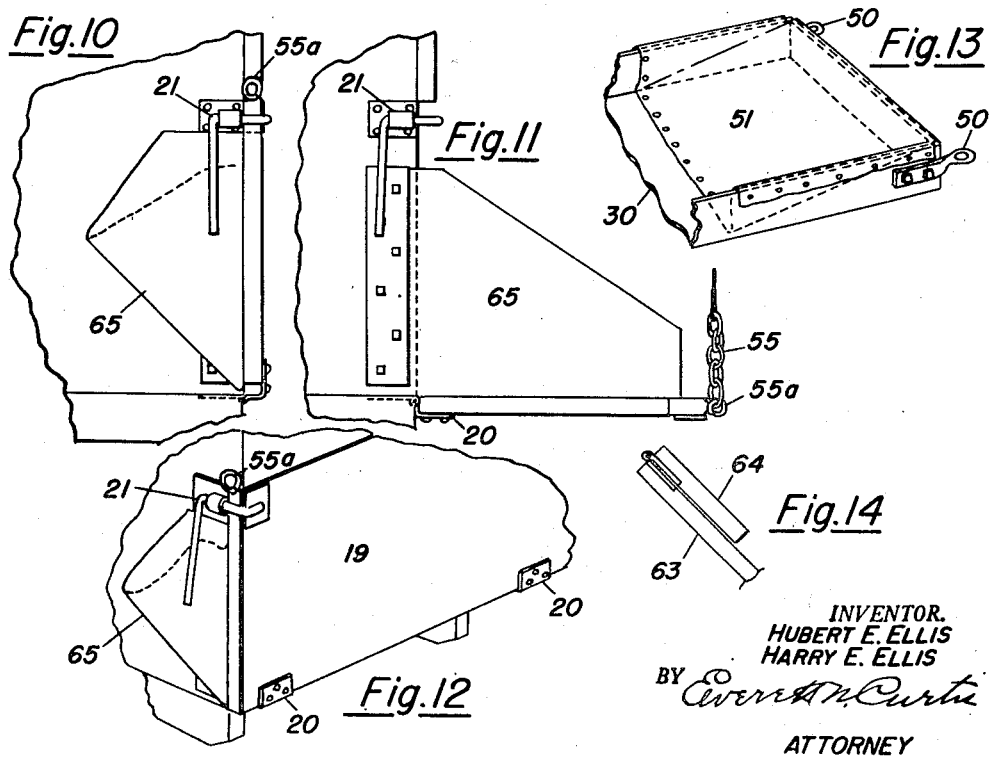
INVENTOR.
HUBERT E. ELLIS
HARRY E. ELLIS
BY
ATTORNEY

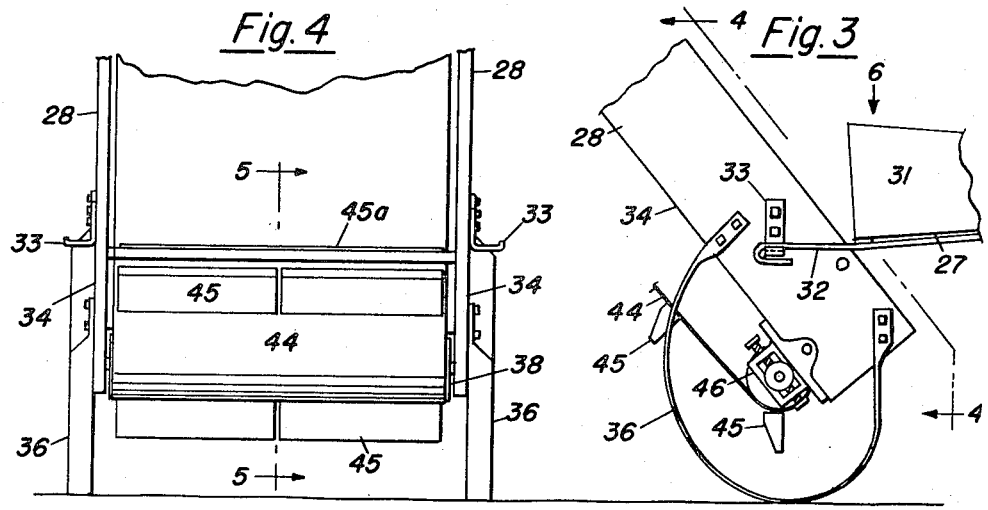
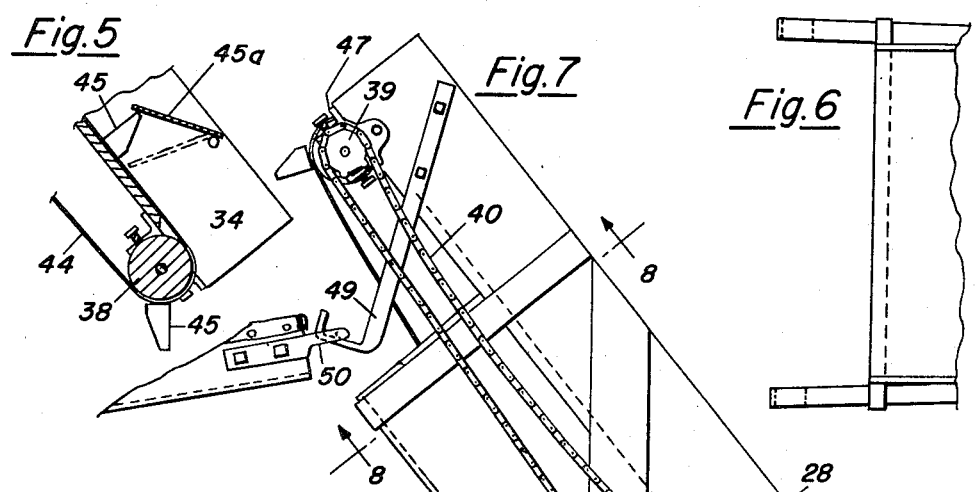
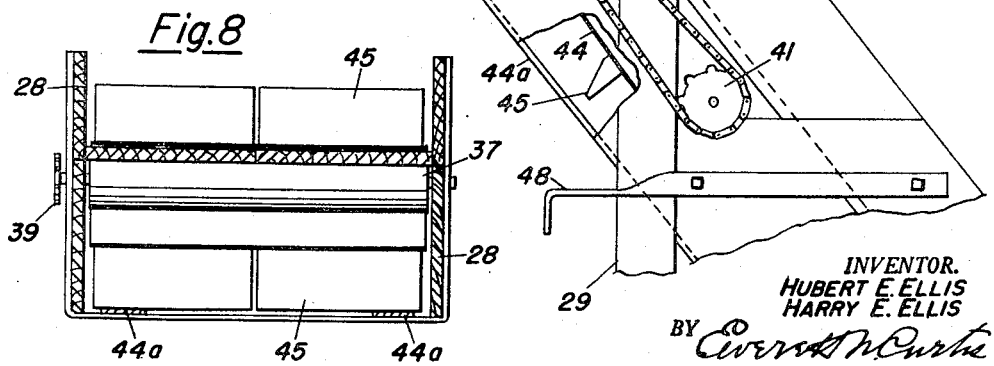

Patented July 31, 1951

2,562,539

UNITED STATES PATENT OFFICE 2,562,539

APPARATUS FOR HANDLING AND LOADING CITRUS FRUIT

Hubert E. Ellis, San Diego, Calif., and Harry E. Ellis, Yuma, Ariz.

Application February 11, 1948, Serial No. 7,616

4 Claims. (Cl. 214—83.36)

Our invention relates to apparatus for handling and loading citrus fruit, and its objects are, to dispense with the necessity of the use of field boxes in the loading or unloading of fruit to be carried to the packing house; to provide a loading means in the field for the ready removal of fruit in bulk from the picking sacks to the delivery truck, together with means for unloading the same upon arrival at the packing house, all substantially without injury to the fruit while being so handled or in the course of its transporation; to permit said loading and unloading means or parts thereof to be readily attached to or detached from the individual truck as may be required, without substantial loss of time and effecting great saving in labor; to allow the employment of but one driver for the handling of two trucks, permitting one truck to be driven to the packing house while the other is being loaded, thereby eliminating swampers in the field and overtime on the part of drivers and the picking crew through better coordination of the work; to construct portable apparatus of the said character which is compact, economical of space, and which is susceptible of immediate installation, or disconnection or removal; to render the parts of our apparatus readily accessible for inspection, adjustment, replacement, restoration or repair, and generally to provide apparatus which is economical of construction, efficient in action and of prolonged life and durability. Our invention further consists of other novel features of construction, and combinations and arrangements of parts, illustrated in the drawing, and hereinafter more specifically described and claimed.

At the present time, in the picking, handling and loading of citrus fruits for transportation in delivery trucks from the orchard to the packing house, field boxes filled from picking sacks used by the pickers are customarily employed as a convenient and essential means for handling and loading the fruit upon the trucks, and also for unloading and dumping the fruit upon the receiving conveyor upon arrival at the packing house. The use of such boxes, however, necessitates considerable handling of the fruit and the piling of one box full of fruit upon another when loaded upon the truck, often resulting in the jamming, bruising, scratching or other impairment of the fruit, thereby leading to its decay and its elimination from the market as a saleable food, so that the financial loss from such causes is of consequence and is an item which has to be considered in the carrying on of the business. Also, the labor required in the handling of the boxes both filled and empty is an important element of cost. Through the use of our new apparatus, however, we are able to dispense entirely with the said field boxes, and thereby to effect great savings of time, labor and expense. As the result of considerable experimentation, continued through trial and error over an extended period under actual conditions encountered in the field, we have gradually developed and perfected our invention, and have succeeded in providing a means for loading and transporting the fruit, which not only does away with field boxes but does the work more effectively and expeditiously, and with greatly lessened loss from decay.

In order to load the fruit from the picking sacks directly upon the truck, and within the bin thereof, we have devised a detachable loader incorporating an endless belt conveyor operated by a small combustion engine, and allowing the picker gently to pour or dump the fruit from his sack thereon, to be carried upon said conveyor up over the tail board of said truck and through a distributing chute to fall upon a canvas drape located within said bin and extending from the top of the front board thereof backward to the floor of the truck and to break the fall of said fruit; so that as the supply of fruit continues to be brought up by said loading conveyor and falls upon said drape, it will roll downwardly gently without injury to the floor of the truck and gradually pile up to fill the bin thereof. Thereupon, when the truck is so filled with the fruit, the portable loader is detached therefrom and moved to be attached to an awaiting empty truck. Thus the employment of said loader allows a driver to handle two trucks, one which when filled he drives to the packing house, and the other which he leaves to be filled while driving the first. Upon arrival at the packing house, the truck is driven upon a tilted ramp. A hinged side gate of the truck bin nearest said house is swung open, and the fruit caused to roll gently upon wide inclined rollers which carry the fruit up to the belt moving toward the cleansing equipment. From there on through the packing house, the fruit is handled just as it is in any other packing house operation. In consequence of such new method of handling, loading, and transporting citrus fruit from the picking sacks in the field to the unloading of the fruit at the packing house, the necessity of the use of field boxes has been entirely dispensed with. No longer is required the filling of the boxes at the orchard by the pickers from the picking sacks, the piling of such boxes so filled upon the trucks by swampers in the field, and the unloading of such boxes and the discharge of their contents at the packing house; all resulting in a great saving of time and labor in dispensing with the handling of the boxes both when filled with and empty of, the fruit.

Attention is hereby directed to the accompanying drawing, illustrating preferred forms of apparatus incorporating our invention and employed by us in carrying out the method thereof, in which similar numerals of designation refer to similar parts throughout the several views, and in which:

Figure 1 is a side elevation of one form of our improved truck loading apparatus, showing the truck, drape (in dashed lines), distributing chute, elevator conveyor, and fruit receiving hopper;

Fig. 2 is a front elevation of the truck and side elevation of a conventional receiving conveyor at the packing house, showing the truck in discharging position upon the inclined unloading ramp, with side gate lowered and inclined downwardly by a hand operated hoist so as to cause the fruit to roll out by gravity upon said conveyor over an extendable apron affixed thereto;

Fig. 3 is an enlarged view of the lower end of the elevator conveyor and adjacent frame-work thereof, shown in Fig. 1, showing the skid shoes, conveyor belt and attached cleats, lower pillow block for adjusting tension of the belt, fruit receiving hopper with mating hooks, and brackets for removably attaching the same to the said conveyor;

Fig. 4 is a front elevation of the enlarged detail shown in Fig. 3, looking in the direction of the arrows 4—4, the fruit receiving hopper being removed for the purpose of better illustration;

Fig. 5 is a vertical section on line 5—5 of Fig. 4, looking in the direction of the arrows, showing detail of the hinged baffle, bottom roller, adjacent portion of belt and attached cleat;

Fig. 6 is a plan view of the inner end of the fruit receiving hopper, shown in Fig. 3, and looking in the direction of the arrow 6, and showing the bottom, side walls and attaching hooks of said hopper;

Fig. 7 is an enlarged view of the upper end of the elevator conveyor shown in Fig. 1, showing the adjacent frame-work thereof, counter shaft sprocket, drive chain, upper conveyor belt, drive roller and adjustable pillow block box therefor, attaching hook positioned for engagement with mating hook on distributor chute, and attaching hook located for engagement with the tail board of the truck;

Fig. 8 is a section on line 8—8 of Fig. 7, looking upwardly in the direction of the arrows, and showing adjacent parts of the frame of the elevator conveyor, top or driven roller mounted thereon, conveyor belt travelling over said roller and having affixed thereto divided cleats for moving the fruit and longitudinally extending skid strips secured to said frame upon which ride said cleats returning to elevating position and which serve to guard against and prevent damaging contacts with the adjacent parts of the truck;

Fig. 9 is an enlarged view of the forward upper end of the bin of the truck body and adjacent parts shown in Fig. 1, certain parts being shown cut away for the purpose of better illustration, and showing the canvas drape secured to top of the front board and sloping with ample side clearance downwardly and rearwardly to the bed of the truck, inclined distributing chute and tubular support therefor, and adjacent parts, left side gate hinged to said bed, locking mechanism therefor and folded canvas aprons at sides thereof;

Fig. 10 is a detail end view of the left front end of the body of the truck shown in Fig. 9, showing the mechanism for locking the left side gate, and the eye or hook for attaching the winch lowering cables;

Fig. 11 is a view similar to that shown in Fig. 10, showing, however, the left side gate in lowered position, with the end aprons fully extended and serving to prevent the fruit from falling off the ends of such gate when being discharged from the truck.

Fig. 12 is a view in perspective of the end parts shown in Figs. 9, 10 and 11;

Fig. 13 is a view in perspective of the upper end of the inclined distributing chute, showing the special provision of a bed of canvas to insure the gentle fall of the fruit thereon, before rolling down the chute to be dropped upon the drape, and showing the eyes or loops for attachment to the frame of the elevator conveyor;

Fig. 14 is an enlarged end view of the hinged extension of the apron affixed to and forming part of the conventional receiving conveyor of the packing house, shown in Figs. 2 and 15;

Fig. 15 is an enlarged view in perspective of the receiving conveyor at the packing house shown in Fig. 2, and showing the hand operated winch and cables for adjusting the adjacent side gate of the truck, and the general arrangement for the discharge of fruit therefrom upon said conveyor, and Fig. 16 is a sectional view on line 16—16 of Fig. 15, looking in the direction of the arrows.

Referring to the drawing, the bin 17 of the body of the truck 18, is rectangular in form and is provided with side gates 19, arranged to swing outwardly and downwardly upon hinges 20 secured to the bottom of the truck, and, when closed, to be held in position by the locks 21 respectively, mounted upon the front and tail boards 22 and 23 of said truck. Removably secured by a cleat 24, or other suitable means, to the top of front board 22 is one end of the drape 25 formed from heavy canvas belting or other suitable material, and disposed to slope rearwardly to the floor of said truck. Preferably, the drape 25 is of a width of about one half of the space between the side walls of the truck, so as to leave ample space on each side of the drape, after receiving the fall of the fruit thereon, for loading disposition thereof as hereinafter described.

Removably attached to the tail board 23 and rear portion of the truck and inclined thereto is our portable loading apparatus 26, comprising the fruit receiving hopper 27, the conveyor frame 28, elbow supports 29 therefor, conveyor belt 44 and distributing chute 30. The hopper 27 is preferably in the form of an elongated flat bottomed trough having raised side rails 31, and is designed to be removably attached to the lower end of the frame 28 by a pair of strap hooks 32, the shanks of which are firmly secured to the bottom of said hopper and the hooks of which engage with L-shaped brackets 33 mounted upon the side walls 34, near the lower ends of said frame 28; cables 35 affixed to the inner ends of the side rails of said hopper and to the walls of said frame, serving to support and to hold the said hopper inclined inwardly toward said frame as shown, so as to cause any citrus fruit in said hopper to roll toward the conveyor belt by gravity and to be discharged thereon. Preferably, there are secured to the bottom ends of the side walls 34 of the frame 28, skid shoes 36 looped from strips of resilient metal and acting to raise in convenient position for the workman the lower parts of said loading apparatus and to keep the same off the ground.

Journalled in suitable bearings in the walls of the box 28, at the top and bottom thereof, respectively, are the driven and idler rollers 37 and 38; the roller 37 being connected with sprocket 39 and driven therefrom through its connection by chain 40 with sprocket 41, conventionally mounted upon a countershaft journalled in suitable bearings in said walls 28, and conventionally connected by belt 42 with a pulley on the driving shaft of the motor or engine mechanism 43, mounted upon a plate 43a carried by elbow support 29.

Mounted upon and extending between said rollers 37 and 38, and deeply enclosed by the walls 34 of the frame 28, is the endless conveyor belt 44, of canvas or other suitable material, and having secured thereon at regular spaced intervals, the divided cleats 45, forming pockets for the reception and upward conveyance of citrus fruit loaded therein from said hopper, and moved upwardly upon the starting and continued operation of said engine or motor. Preferably, the idler roller 38 is journalled in bearings carried in adjustable pillow boxes 46 mounted upon the lower ends of the side walls 34 of the conveyor frame 28; and driven roller 37 is journalled in bearings carried in adjustable pillow boxes 47 mounted upon the upper ends of said walls 34; the two pillow boxes serving at all times to adjust, as may be required, the tension of the belt 44.

To prevent the sagging of the belt 44 to such an extent as to bring about possible entangling contact of the downwardly protruding ends of the cleats 45 with adjacent parts of the truck, long skid strips or rails 44a are preferably secured to the underneath portion of the frame 28, and are positioned so as to cause the ends of said cleats to slide or ride thereon as the belt travels downwardly in its path from the roller 37 to the roller 38.

In order that the citrus fruit poured by the picker into the hopper 27, and rolling by gravity into the pockets provided by the spaces between the cleats may not fall backwardly from and out of the conveyor belt 44 while being so transferred thereto, there is provided the baffle 45a, pivotally mounted upon and extending between the walls 34 of the frame 28 adjacent to the idler roll 38 directly in advance of the course of travel of said fruit, and positioned so as to be raised by said cleats while passing successively thereunder as shown in Fig. 5; thereby sustaining the passage of said fruit to and upon said belt and preventing any backward departure therefrom.

To attach the loading apparatus to the truck in the inclined position shown in the drawing, the elbow supports 29 are abutted against the tail board 23, and the conveyor frame 28 is secured to the metallic reinforced top of said board by the strap hooks 48 mounted upon the walls of said frame and engaging with said board. Also secured to said frame 28 are the strap hooks 49, diagonally located thereon near the top thereof, and positioned to engage with loops 50 attached to the end of the distributing chute 30, which is a greatly elongated flat bottomed trough downwardly inclined and extending nearly to the front board of the truck; a section of pipe or metallic bar 52, which extends laterally across is secured to the top of the walls of the bin of said truck, serving to support the forward end of said chute and to bring its discharge end in close proximity with the upper portion of the drape 25. In order to insure the gentle fall of the fruit as it comes off the conveyor belt, we preferably provide the upper end of the chute 30 with the soft bed or pad of canvas 51 (see Fig. 13).

Upon the truck being loaded at the orchard with fruit as hereinbefore set forth, it is driven to the packing house where upon arrival it is run upon the ramp 53, which is a flat platform of cement or other road suitable material located close to wall of the packing house and appreciably inclined thereto and adjacent to and in close proximity to the conventional endless conveyor 54; so that the said truck may be moved to such position as to bring the left gate thereof, when opened, over the said conveyor and continuously to discharge the fruit carried by said truck upon said conveyor. Upon the said truck being so located, and preparatory to the unlocking of the locks thereof, the lower ends of the cables 55 are made fast to eyes 55a affixed to the upper edges of said gate near the corners thereof; the free ends of said cables being rove through pulleys 57 mounted upon brackets 58 fastened to the adjacent upper part of the wall posts 59 and 60 of said packing house, and continuing downwardly being wound upon the drum of the winch 61, secured to the lower part of post 59 and operated by the hand crank 62. Thereupon, the said gate is unlocked and opened and carefully lowered through the operation of said winch, from its upright position as shown in Figs. 9, 10 and 12 to its extended horizontal position shown in Figs. 2 and 11; the lower face of said gate contacting and extending over the hinged apron 63, forming part of the frame of the conveyor 54. Preferably the said apron is provided with the hinged extension 64, which as occasion requires may be opened and employed to effect better engaging contact with adjacent side gate 19. In order to prevent the escape of the fruit while being unloaded, from the ends of the gates 19, there are preferably secured to said ends, front board 22, and tail board 23, canvas accordion pleats 65; which upon being extended upon the opening of said gates constitute curtained sides as shown in Figs. 2 and 11, and which when collapsed upon the closing of the gates are folded against the side of the truck as shown in Figs. 9, 10 and 12.

Upon the opening of the left side gate 19, as shown in Fig. 2, the fruit, because of the inclination of the truck and the pull of gravity, will rapidly pour through the passageway formed between the said pleats 65, and be discharged upon the moving slats 54a of the inclined conveyor 54, and be carried upwardly thereon and deposited upon the belt 66, moving toward the cleansing equipment in the manner well understood in the art. The conveyor 54 is for the most part of the conventional form commonly employed in citrus fruit packing houses for receiving the fruit dumped thereon from field boxes in accordance with the general practice employed in relation thereto; except that certain parts of the conveyor have been modified and changed to accommodate the conveyor to the method of our invention. Thus a special form of hinged apron 63 and extension 64 thereof has to be provided in order to insure the efficient discharge of the fruit from the truck to the conveyor. Provision must be made for varying the speed of the conveyor 54 to conform to the movement of the fruit as it is discharged thereon; and the inclined ramp is an essential element in the efficient unloading of the fruit.

Our invention may be embodied in other specific forms without departing from the spirit or essential characteristics thereof. The present embodiments, as above set forth are therefore to be considered in all respects as illustrative and not restrictive, the scope of our invention being indicated by the appended claims rather than by the foregoing description, and all changes which may come within the meaning and range of equivalency of the claims are therefore intended to be embraced therein.

What we claim and desire to secure by Letters Patent is:

1. In apparatus for handling, loading and transporting citrus fruit in a truck from the field in bulk to the packing house, the combination of a hopper for receiving the fruit, belt conveyor means connected with said hopper for elevating the fruit so received in a continuous stream flowing from said hopper to and over the top of the bin of the truck, trough distributing means mounted upon the top of said bin for receiving said fruit from said conveyor and inclined to conduct it to the front of said bin at the upper part thereof, a drape secured to the top of the front wall of said bin and extending downwardly and rearwardly within the hollow thereof, and positioned to break the fall of the fruit coming from said trough.

2. In apparatus for handling, loading and transporting citrus fruit in a truck from the field in bulk to the packing house, the combination of an inclined hopper for receiving the fruit, belt conveyor means connected with said hopper for elevating the fruit so received in a continuous stream flowing from said hopper to and over the top of the bin of the truck, trough distributing means mounted upon the top of said bin for receiving said fruit from said conveyor and inclined to conduct it to the front of said bin at the upper part thereof, a drape secured to the top of the front wall of said bin and extending downwardly and rearwardly within the hollow thereof, and positioned to cushion the fall of the fruit coming from said trough; and means after the truck has arrived at said packing house for inclining the truck thereto, and gate controlled means connected with the sides of said truck for causing the fruit in bulk to flow out from said truck by gravity and to be discharged upon the receiving conveyor of said packing house.

3. In apparatus for handling, loading and transporting citrus fruit in a truck from the field in bulk to the packing house, the combination of a hopper for receiving the fruit, belt conveyor means connected with said hopper for elevating the fruit so received in a continuous stream flowing from said hopper to and over the tail board of the bin of the truck, trough distributing means mounted upon said tail board and bin for receiving said fruit from said conveyor and inclined to conduct it to the front of said bin at the upper part thereof, a drape secured to the top of the front board of said bin and spaced from the sides thereof and extending rearwardly and downwardly within said bin to the bottom thereof and constituting means for cushioning the fall of the fruit coming from said trough.

4. In apparatus for handling, loading and transporting citrus fruit in a truck from the field in bulk to the packing house, the combination of a hopper for receiving the fruit, belt conveyor means connected with said hopper for elevating the fruit so received in a continuous stream flowing from said hopper to and over the tail board of the bin of the truck, trough distributing means mounted upon said tail board and bin for receiving said fruit from said conveyor and inclined to conduct it to the front of said bin at the upper part thereof, a drape secured to the top of the front board of said bin and spaced from the sides thereof and extending rearwardly and downwardly within said bin to the bottom thereof and constituting means for cushioning the fall of the fruit coming from said trough; means after the truck has arrived at said packing house for inclining the truck thereto, and gate controlled means connected with the sides of said truck for causing the fruit in bulk to flow out from said truck by gravity and to be discharged upon the receiving conveyor of said packing house.

HUBERT E. ELLIS.
HARRY E. ELLIS.

REFERENCES CITED

The following references are of record in the file of this patent:

UNITED STATES PATENTS

| Number | Name | Date |
|---|---|---|
| 57,008 | Stone | Aug. 7, 1866 |
| 1,716,240 | Postweiler | June 4, 1929 |
| 1,839,712 | Sturtz | Jan. 5, 1932 |
| 2,045,149 | Vessey | June 23, 1936 |
| 2,267,234 | Garber | Dec. 23, 1941 |
| 2,290,844 | Smith | July 21, 1942 |
| 2,395,124 | Jelderks | Feb. 19, 1946 |

FOREIGN PATENTS

| Number | Country | Date |
|---|---|---|
| 395,411 | Great Britain | July 17, 1933 |